(12) United States Patent
Dichristina et al.

(10) Patent No.: US 6,627,428 B1
(45) Date of Patent: Sep. 30, 2003

(54) DEGRADATION OF ORGANIC CONTAMINANTS BY A MICROBIALLY-DRIVEN FENTON REACTION

(75) Inventors: Thomas J. Dichristina, Atlanta, GA (US); Adonia M. McKinzi, Marietta, GA (US)

(73) Assignee: Georgia Tech Research Corp., Atlanta, GA (US)

( * ) Notice: Subject to any disclaimer, the term of this patent is extended or adjusted under 35 U.S.C. 154(b) by 0 days.

(21) Appl. No.: 09/669,523

(22) Filed: Sep. 25, 2000

Related U.S. Application Data
(60) Provisional application No. 60/155,846, filed on Sep. 24, 1999.

(51) Int. Cl.[7] .............................. C02F 3/34; C12S 13/00
(52) U.S. Cl. ............................. 435/262.5; 435/253.3; 210/611; 210/747
(58) Field of Search .............................. 435/262, 262.5, 435/253.3, 874, 876; 210/610, 611, 719, 721, 747

(56) References Cited

U.S. PATENT DOCUMENTS

| | | | |
|---|---|---|---|
| 5,739,028 A | * | 4/1998 | Caccavo et al. ............. 435/168 |
| 5,741,427 A | | 4/1998 | Watts et al. |
| 5,773,283 A | | 6/1998 | Pierce |
| 5,783,088 A | | 7/1998 | Amonette et al. |
| 5,888,396 A | | 3/1999 | Perriello |
| 5,955,350 A | | 9/1999 | Soni et al. |
| 5,967,230 A | | 10/1999 | Cooper et al. |
| 6,110,372 A | | 8/2000 | Perriello |

OTHER PUBLICATIONS

McKinzi, A. and DiChristina, T., "A Microbially–Based Hydroxyl Radical–Generating System for the Biodegradation of Pentachlorophenol," presented at 97th General Meeting of American Society for Microbiology, 1997.

McKinzi, A. and DiChristina, T., "Optimization of a Microbially–based Hydroxyl Radical–Generating System for the Biodegradation of Pentachlorophenol," presented at 98th General Meeting of American Society of Microbiology, 1998.

* cited by examiner

Primary Examiner—William H. Beisner
(74) Attorney, Agent, or Firm—Thomas, Kayden, Horstemeyer & Risley LLP; Todd Deveau (57) ABSTRACT

The present invention is directed to a microbially-driven Fenton reaction for the transformation of organic contaminants. The microbially-driven Fenton reaction combines abiotic and biotic reactions in one system by utilizing the $H_2O_2$— and Fe(II)-producing microorganism *Shewanella putrefaciens* to generate Fenton reagents as metabolic by-products of alternating aerobic and anaerobic respiration. Accordingly, the present invention is directed to a process for oxidatively degrading organic contaminants comprising reacting Fe(III) citrate with *S. putrefaciens* under alternating anaerobic and aerobic conditions to generate Fenton reagents Fe(II) and $H_2O_2$, further reacting the Fenton reagents under neutral pH conditions with the organic contaminant to produce degraded transformation products of the contaminant.

31 Claims, 8 Drawing Sheets

DEGRADATION OF ORGANIC CONTAMINANTS BY A MICROBIALLY-DRIVEN FENTON REACTION

This application claims priority to U.S. provisional patent application No. 60/155,846, filed on Sep. 24, 1999.

BACKGROUND OF THE INVENTION

1. Field of the Invention

The present invention is in the field of degradation of organic contaminants, and more specifically is directed to a process for oxidatively degrading pentachlorophenol by a microbially driven Fenton reaction.

2. Description of the Related Art

Hazardous waste cleanup in soil and groundwater has gained increased attention recently due to the increasing number of waste disposal sites. Economic and environmental considerations spur research towards alternative remediation methods. Bioremediation has been studied as a possible alternative to other conventional waste treatment processes.

Pentachlorophenol (PCP) is a recalcitrant biocide widely used throughout the United States as a fungicide and wood preservative. Paper mill wastewater effluents and groundwaters are often contaminated with PCP, which is classified as a priority pollutant by the United States Environmental Protection Agency.

Research has focused on the conversion of PCP contained in soil and groundwater by on-site and in situ treatments, including incineration and bioremediation. Incineration has the disadvantage of formation of harmful by-products. Accordingly, a great deal of research has focused on improved remediation of organic components in soils, sediments, sludges and slurries.

Free radical-based oxidation technologies provide an attractive alternative to conventional treatment strategies for elimination of hazardous waste. These treatment technologies harness the oxidizing potential of hydroxyl radicals to degrade a wide variety of hazardous organic compounds. Hydroxyl radicals are among the most reactive oxidants found in aqueous environments and can readily oxidize a variety of naturally occurring and contaminating organic compounds. The hydroxyl initiates a cascade of oxidation reactions that can lead to total mineralization of organic pollutants.

Radical-based oxidation reactions have been used in the art in conjunction with biological treatment. U.S. Pat. No. 5,955,350 to Soni et al. discloses a process for remediation of contaminated solid materials containing polynuclear aromatic hydrocarbons, polychlorinated hydrocarbons and mixtures thereof by sequential biological/chemical/biological treatment. Soni's process includes a first aerobic digestion, followed by chemical treatment of the reaction product with hydrogen peroxide in the presence of ferrous ion in an amount to oxidize the hydrocarbons, and then following the chemical treatment with a second aerobic digestion of the hydrocarbons. The biodigestion steps are achieved with microorganisms, preferably *Alcaligenes eutrophus* and *Pseudomonas sp.*

U.S. Pat. No. 5,773,283 to Pierce also discloses the use of microorganisms in bioremediation. Pierce discloses pretreating a chlorinated hydrocarbon contaminant with Fenton's reagent, followed by introduction of a microorganism for biodegradation.

Specific microorganisms such as *Shewanella putrefaciens*, a Fe(III)-reducing bacteria, have been linked with direct degradation of a variety of organic contaminants, as reported in U.S. Pat. No. 5,783,088.

Abiotic degradation processes utilizing the powerful oxidative potential of free radicals have been developed for the removal of biorefractory hazardous compounds from industrial effluent and contaminated aqueous environments. These processes generate oxidizing radicals through a variety of mechanisms including UV-potentiated radical propogation (UV/$O_3$, UV/$H_2O_2$, UV/$TiO_2$) and transition metal-catalyzed radical formation (Fe(II)/$H_2O_2$, Fe(II)/Fe(III)-$H_2O_2$, Fe(II)/UV/$H_2O_2$). These systems are based on the production of hydroxyl radicals (OH*) which initiate a cascade of reactions that result in the formation of both organic radical intermediates and activated oxygen forms ($O_2^{-*}$, $HO_2^*$, OH*). Mineralization of target hazardous compounds is achieved through a series of complex reactions involving radical intermediates until only $H_2O$, $CO_2$, and $Cl^-$ remain. The reaction of OH* with organic compounds is unselective and rapid ($k > 10^8$ $M^{-1}s^{-1}$) and has been used to oxidize a broad range of hazardous organic compounds including pesticides, herbicides, and solvents.

Fenton reaction-generated hydroxyl has been used to treat a wide variety of hazardous organic compounds, including landfill leachates, groundwater contaminated with chlorinated aliphatics and aromatics, drycleaning solvents, nitroaromatic compounds, and azo dyes. Although Fenton reaction-based processes can effectively degrade a wide variety of hazardous organic compounds, continuous addition of Fe(II) and $H_2O_2$ is required. In hydroxyl radical technologies operating at a pH of greater than 5, the continuous addition of Fe(II) also results in the generation of large quantities of particulate Fe(III), which contributes to sludge disposal problems.

It is therefore an object of the present invention to design a microbially driven, Fenton reaction-based radical-generating system that operates under neutral pH conditions and requires neither the addition of $H_2O_2$ nor the photolysis of Fe(III) to catalyze the oxidative degradation of organic contaminants.

It is a further object of the present invention to combine abiotic and biotic reaction pathways and utilize the $H_2O_2$— and Fe(II)-producing microorganism *Shewanella putrefaciens* Strain 200P to generate Fenton reagents as metabolic by-products of alternating aerobic and anaerobic respiration.

SUMMARY OF THE INVENTION

The present invention is directed to a microbially-driven Fenton reaction for the transformation of organic contaminants. The microbially-driven Fenton reaction combines abiotic and biotic reactions in one system by utilizing the $H_2O_2$— and Fe(II)-producing microorganism *Shewanella putrefaciens* Strain 200P to generate Fenton reagents as metabolic by-products of alternating aerobic and anaerobic respiration. Microbially-produced Fe(II) and $H_2O_2$ react to form OH* via the classic Fenton reaction:

$$Fe(II) + H_2O_2, \phi OH^* + OH^- \qquad (1)$$

OH* subsequently reacts with the organic contaminant to yield transformation products, which can be further degraded. In the case of pentachlorophenol (PCP), the Fenton reaction product OH* reacts with PCP to yield the hydroxylated transformation products tetrachlorohydroquinone (TCHQ) and tetrachlorocatachol (TCC). Optimal substrate levels are critical for optimizing degradation rates in the microbially-driven system. The process of the present invention allows for the determination of the optimal substrate concentrations (Fe(II), Fe(III), and organic contaminant) and reactor conditions (cell densities, Fe(II) oxidation rates) for maximum rates of contaminant transformation in the microbially-driven Fenton reaction.

Accordingly, the present invention is directed to a process for oxidatively degrading organic contaminants comprising reacting Fe(III) citrate with *S. putrefaciens* under alternating anaerobic and aerobic conditions to generate Fenton reagents Fe(II) and $H_2O_2$, further reacting the Fenton reagents under neutral pH conditions with the organic contaminant to produce degraded transformation products of the contaminant.

BRIEF DESCRIPTION OF THE DRAWINGS

FIGS. 7A–7D are Agar-hydrolyzing (AGR) phenotypes expressed by the Fe(II)- and $H_2O_2$-producing microorganism *S. putrefaciens* strain 200P. Sp200P was grown on solid media supplemented with 50 mM Fe(II)-Citrate and incubated 5 days at 30° C.: FIG. 7A: strain 200, aerobic conditions; FIG. 7B: strain 200, anaerobic conditions; FIG. 7C: Fe(III)-reduction deficient mutant T121, aerobic conditions; FIG. 7D: strain 200 aerobic conditions with DETA-PAC (7 mM), mannitol (50 mM), and benzoate (8 mM)

DETAILED DESCRIPTION OF THE INVENTION

Definitions and Nomenclature

As used herein, the term Fenton reaction-based process refers to a process wherein Fe(III) catalytically decomposes $H_2O_2$ to regenerate Fe(II).

As used herein, the term organic contaminant refers to pentachlorophenol, aromatic, alkyl-aromatic, nitro-aromatic, halo-aromatic, halo-nitro-aromatic, aliphatic and halo-aliphatic compounds, especially those used as organic solvents. The term includes, but is not limited to, benzene, toluene, ethylbenzene, xylene, naphthlene, biphenyls, methylene chloride, dichloroethane, chloroform, dichloropropane, dibromochloromethane, trichloroethane, dichloropropene, bromoform, chloromethane, bromomethane, vinyl chloride, chloroethane, dichloroethane, trichloroethane, dichlorobenzenes, dichlorobutane, trichloropropane, dichloropropane, bromobenzene, chlorotoluenes, trichlorobenzenes, trimethylbenzenes, nitrobenzene, and dinitrobenzene. Particularly preferred contaminants include pentachlorophenol, benzene, toluene, xylene and trichloroethane.

In contrast to traditional Fenton- or photo-Fenton-based oxidation systems, the microbially driven Fenton reaction system operates at neutral pH and requires neither addition of exogenous $H_2O_2$ nor UV irradiation to regenerate Fe(II). The anaerobic Fe(III) reduction system of *S. putrefaciens* functionally replaces UV light as the Fe(II) regenerator, while the aerobic electron-transport system produces $H_2O_2$ as a metabolic byproduct of aerobic respiration. The present invention is directed to a method for degradation of organic contaminants, including pentachlorophenol (PCP), comprising introducing *S. putrefaciens* and iron(III) citrate to a contaminant, and alternately sparging the contaminant with compressed nitrogen and compressed air, effectively alternating between aerobic and anaerobic conditions.

EXAMPLE 1

Optimal substrate levels and reactor conditions for pentachlorophenol (PCP) degradation were determined for a microbially-driven Fenton reaction. The optimized system was based on a free radical-generating reaction between microbially-produced Fe(II) and $H_2O_2$. PCP was converted to the principal transformation products tetrachlorohydroquinone (TCHQ) and tetrachlorocatechol (TCC). Under optimal conditions, TCHQ and TCC were further degraded to unknown end-products. The Fe(III)-reducing facultative anaerobe *Shewanella putrefaciens* catalyzed the production of both $H_2O_2$ and Fe(II) by alternating Fe(III)-supplemented batch cultures between aerobic and anaerobic conditions. PCP degradation rates varied directly with cell density and initial PCP concentration, and inversely with Fe(II) oxidation rate and initial Fe(III) concentration. Optimal substrate levels and reactor conditions included a cell density of 2×$10^9$ cells $ml^{-1}$, initial PCP concentration of 188 μM, an initial Fe(III) concentration of 2.5 mM and an Fe(II) oxidation rate of 84 μM$min^{-1}$. Optimized PCP degradation rates (9.2 μM$hr^{-1}$) were 30-fold higher than those previously reported for this system and were achieved without UV irradiation, continual inputs of exogenous $H_2O_2$ or low pH conditions.

Culture Medium and Reagents. *S. putrefaciens* strain 200 and the PCP-acclimated strain 200P were grown aerobically on LB medium (10 g $L^{-1}$ tryptone, 5 g $L^{-1}$ yeast extract, and 10 g $L^{-1}$ NaCl). *S. putrefaciens* 200 is available under accession number 12577 from the National Collection of Industrial, Food and Marine Bacteria (NCIMB) 23 Machar Drive, Aberdeen, AB24 3RY, Scotland Tel: +44 1224 273332, Fax: +44 1224 272461 Email: enquiries@ncimb.co.uk. PCP degradation experiments were conducted in a lactate (45 mM)-supplemented salt solution (LS; pH, 7.0) (0.5 g $L^{-1}$ $K_2HPO_4$, 2.0 g $L^{-1}$ $Na_2SO_4$, 1.0 g $L^{-1}$ $NH_4Cl$, 0.15 g $L^{-1}$ $MgSO_4.7H_2O$, and 0.5 g $L^{-1}$ yeast extract). Fe(III)-citrate was prepared by previously described methods previously described in the art. PCP, TCHQ, and TCC were obtained from Aldrich.

AGR Phenotype of *S. putrefaciens* 200P. Strain 200P was grown for 5–7 days (30° C.) either aerobically or anaerobically on nutrient agar supplemented with 50 mM Fe(III)-citrate (FNA medium). Control incubations included the presence of the Fe(II)-chelating agent diethylenetetraaminopentacetic acid (DETAPAC), and the radical scavenging compounds mannitol and thiourea. *S. putrefaciens* anaerobic respiratory mutant strain T121 was used as a control strain for the AGR phenotype.

PCP Degradation. Strain 200P was grown aerobically in LB on a rotary shaker (100 rpm, 30° C.) to early stationary phase ($A_{600}$=1.5), harvested by centrifugation at 6000 g (4° C.), and washed and resuspended in LS solution to a final cell density of $3.6 \times 10^9$ cells $mL^{-1}$. The cell suspension was immediately transferred to a Biostat B bioreactor (B. Braun Instrument Co., Allentown, PC) and Fe(III)-citrate and PCP were added at preselected concentrations. The cultures were sparged with $N_2$ and allowed to reduce the Fe(III)-citrate pool until Fe(II) levels increased to approximately 75% of maximum levels. Reactor temperature (30° C.) and pH (7.0) were held constant in all experiments. An Ingold $O_2$ sensor inserted though the reactor headplate was used to monitor dissolved oxygen concentrations. Fe(II) oxidation rates were controlled by varying impellar rotation rates (100–500 rpm) and compressed air inlet rates (1–3 L $min^{-1}$). In a typical experiment, four complete anaerobic/aerobic cycles were carried out during the first 10-h incubation period. Strict anaerobic conditions were maintained for the subsequent 10 h. After Fe(II) levels reached 75% of maximum, compressed air was introduced until Fe(II) levels decreased to 25% of maximum. Three additional anaerobic/aerobic cycles were subsequently carried out. Fe(II) was then slowly oxidized over the next 14 hours until Fe(II) levels reached 0.86 mM. Fe(III)-reducing (anaerobic) conditions were resumed at 47-h and the final anaerobic/aerobic cycle was carried out at 55-h.

Variation of reactor conditions and substrate levels. A series of batch experiments were carried out under the PCP-degrading conditions described above to determine the optimal cell densities, initial PCP concentrations, initial Fe(III) concentration, and Fe(II) oxidation rate for PCP degradation. Cell density experiments were conducted with either $0.8 \times 10^9$ cells $ml^{-1}$, $1.5 \times 10^9$ cells $ml^{-1}$ or $2.0 \times 10^9$ cells $ml^{-1}$. Fe(III)-citrate and PCP were added at concentrations of 10 mM, and 2.5 mg/L PCP, respectively. Experiments to determine optimal initial PCP levels were carried out with either 9 $\mu M$, 38 $\mu M$, 49 $\mu M$, or 188 $\mu M$ PCP. Fe(III)-citrate was added at 10 mM, and cells were resuspended at $1.5 \times 10^9$ cells $ml^{-1}$. Tests to determine optimal initial Fe(III)-citrate concentrations were carried out at cell densities of $1.5 \times 10^9$ cells $ml^{-1}$, 38 $\mu M$ PCP and either 2.5 mM, 5 mM, 10 mM, or 50 mM Fe(III)-citrate. A final set of experiments were designed to test the effect of Fe(II) oxidation rates on PCP degradation. Cell suspensions were exposed to six complete anaerobic/aerobic cycles in the presence of 5 mM Fe(III)-citrate, 38 $\mu M$ PCP and $1.8 \times 10^9$ cells $ml^{-1}$ for 3 h. Fe(II) levels oscillated between 0.72 mM and 4.54 mM and the Fe(II) oxidation rates varied from 50 to 350 $\mu M$ $min^{-1}$.

Figure 7A:
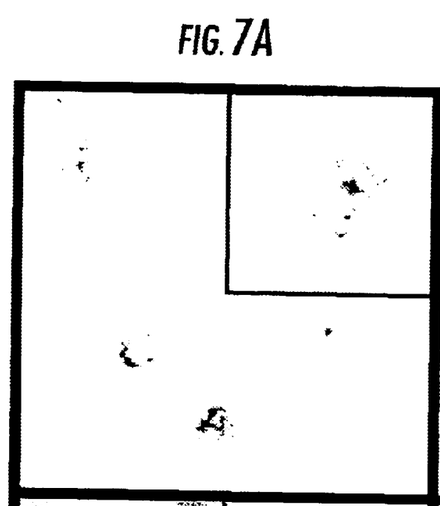
Figure 7B:
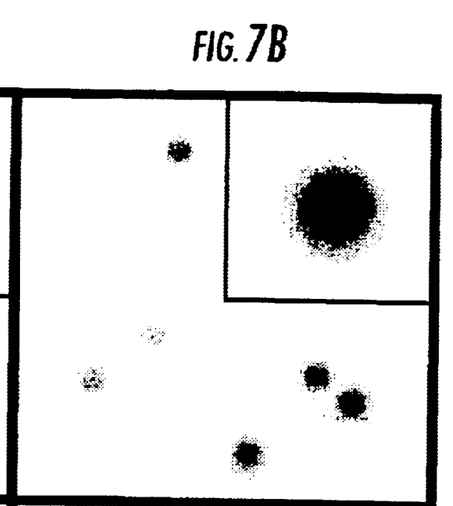
Figure 7C:
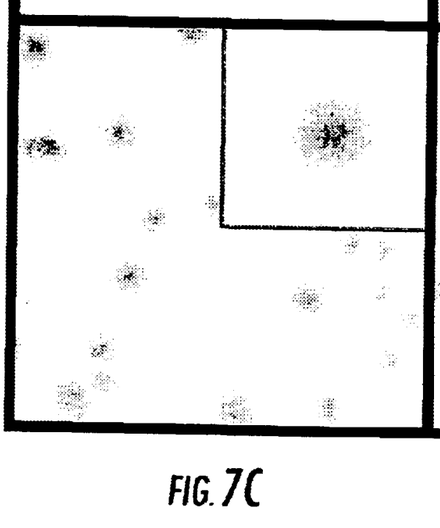
Figure 7D:
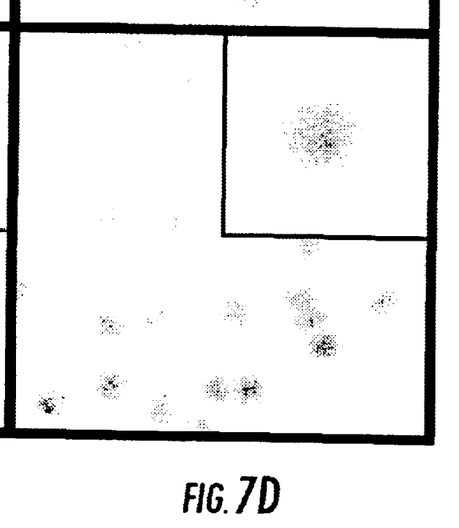

Analytical techniques. Fe(II) concentrations were measured with a previously described ferrozine-based, colorimetric assay. Cell densities were determined via direct counts of acridine orange-stained cells. Duplicate samples (0.5 mL) were withdrawn at preselected time intervals, and PCP (and intermediate transformation products) extracted using a modified version of a previously described liquid extraction technique. Each sample was spiked with an internal standard of tribromophenol (TBP; 1.0 mg $L^{-1}$) and centrifuged at 12,000 g (2 min, 4° C.). The supernatant was transferred to a second vial and the pH raised to >10 by the addition of 25 $\mu L$ of 7.6 g $L^{-1}$ $K_2CO_3$. Each sample was subsequently derivitized for 30 min with 200 $\mu L$ of acetic anhydride (Sigma). The resulting pentachlorophenyl acetate and derivitized transformation products were extracted into 5.0 mL of hexane (Sigma), and analyzed by gas chromatography. PCP concentrations were determined via GC analysis (HP5890, Hewlett Packard) on a 30 m×0.32 mm HP-5 column with a stationary phase film thickness of 0.25 $\mu m$ coupled to a $Ni^{63}$ electron capture detector (ECD). The carrier gas ($He_2$) was introduced at a constant flow rate of 1.0 mL $min^{-1}$. Samples (0.5 $\mu L$) were injected in split mode (50:1 ratio). The injector and detector temperatures were 200° C. and 220° C., respectively. The temperature program ramped from 180° C. for 1 min to 220° C. at a rate of 4° C. $min^{-1}$. Peaks corresponding to pentachlorophenyl acetate (and derivitized transformation products) were identified by co-elution with known standards. The detector response was calibrated via the relative response of the analyte to the internal standard (TBP). Effect of Aerobic Conditions and Fenton-Reaction Inhibitors on AGR-Positive Phenotype of *S. putrefaciens* Strain 200P. Strain Sp200P expressed an AGR-positive phenotype when incubated under aerobic conditions on FNA solid media (FIG. 7a). Conversely, an AGR-negative phenotype was observed when strain 200P was incubated under aerobic conditions on FNA plates supplemented with the Fe(II)-chelating agent DETAPAC, and the radical scavenging compounds benzoate, and mannitol (FIG. 7c). Strain 200P expressed an AGR-negative phenotype when incubated under anaerobic conditions (FIG. 7b). The Fe(III)-reduction deficient mutant T121 (FIG. 7d) expressed an AGR-negative phenotype when incubated under aerobic conditions.

Figure 1:
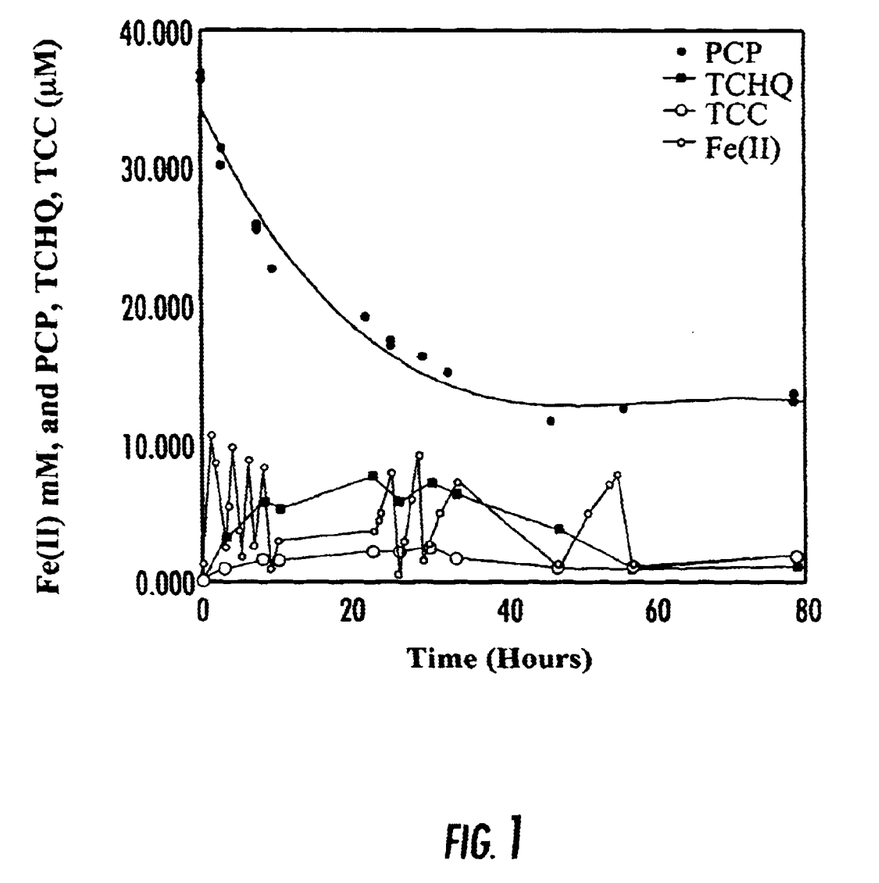
FIG. 1 shows pentachlorophenol (PCP) transformation under alternating aerobic/anaerobic incubation conditions in cell suspensions of Sp200P supplemented with 10 mM Fe(III)-Citrate, and 37.55 μM PCP. Nitrogen sparging was intermittently halted (10–20 h, 33–47 h, and 56–80 h) to allow a longer residence time for oxygen. Lactate (15 mM) was added at 23 and 50 hrs.

PCP Transformation by Microbially-Driven Fenton Reaction and Transient Appearance of TCHQ and TCC. During the first 10-h incubation period, Fe(II) was alternately oxidized and microbially reduced via four anaerobic/aerobic cycles. A linear decrease in PCP concentration (1.3 $\mu M$ $hr^{-1}$) and an increase in the transformation products TCHQ and TCC was observed (FIG. 1). The rates of PCP degradation equaled the rates of TCHQ and TCC formation, indicating that PCP was stoichiometrically converted to TCHQ and TCC during this time period (as previously reported, ES&T '99). $N_2$ sparging was discontinued during the next 12-h period and the culture was exposed to ambient oxygen levels. PCP levels continued to decrease as TCHQ and TCC increased, although at lower rates ($\mu M$ $hr^{-1}$). During the next 11-h period three aerobic/anaerobic cycles were completed and PCP was further degraded while TCHQ and TCC were produced. $N_2$ input was again discontinued during the next 14-h incubation period and the culture again exposed to ambient oxygen levels. During this period, Fe(II) oxidation (7 $\mu M$ $min^{-1}$) occurred more slowly and Fe(II) and Fe(III) were held at equimolar concentrations for nearly the entire 14-h period. TCHQ and TCC concentrations decreased along with PCP during this period. TCHQ levels continued to decrease during the final anaerobic/aerobic cycle while PCP and TCC levels remained constant. PCP, TCHQ, and TCC levels were constant when Fe(II) levels were held unchanged (1.0 mM) during the final 20-h incubation period.

Figure 2:
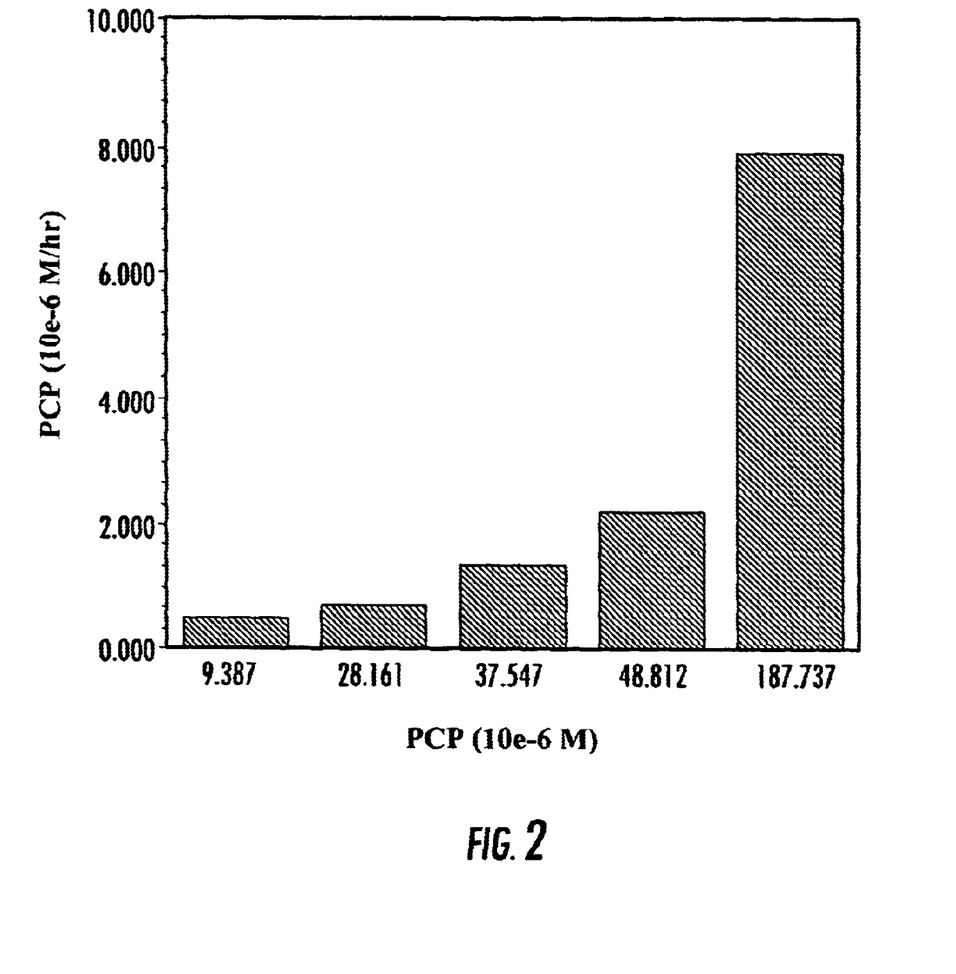
FIG. 2 is a comparison of PCP transformation rates under alternating aerobic/anaerobic incubation conditions in cells suspensions of Sp200P supplemented with 10 mM Fe(III)-Citrate and 9.39, 28.16, 37.55, 48.81, and 187.74 μM PCP.
Figure 3:
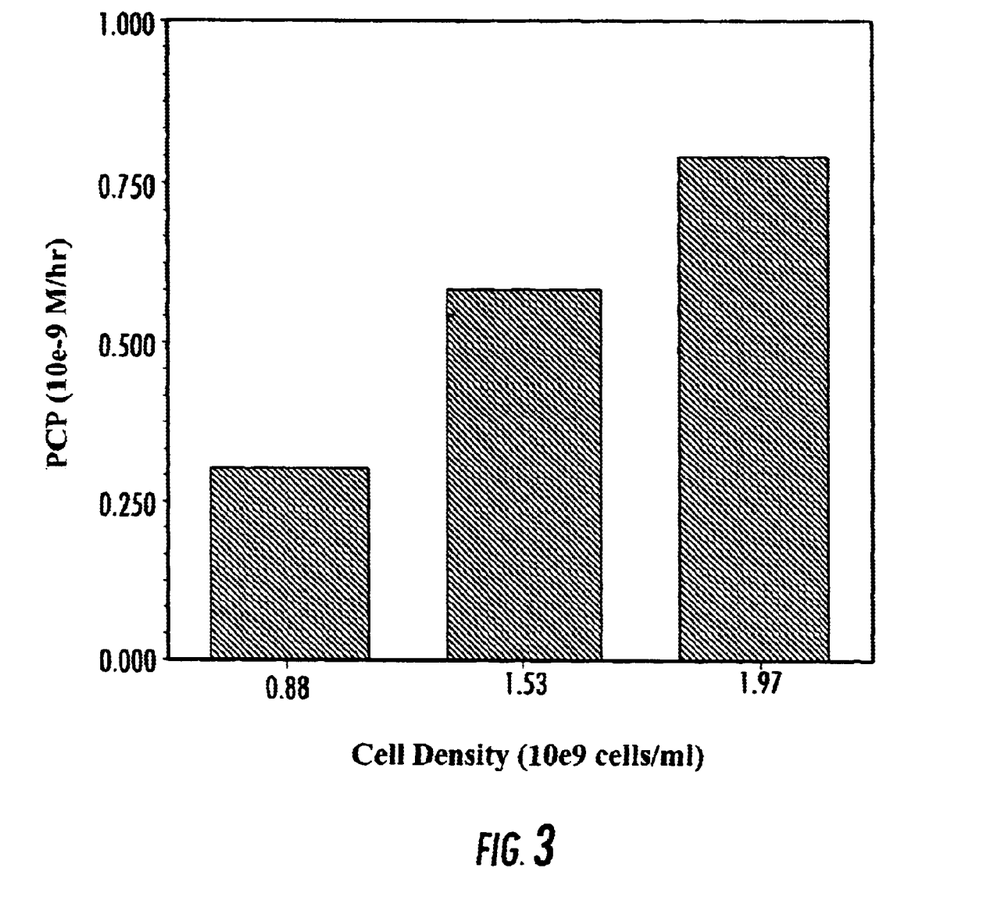
FIG. 3 is a comparison of PCP transformation rates under alternating aerobic/anaerobic incubation conditions in cells suspensions of Sp200P with cell densities ($10^9$ cells $ml^{-1}$) of 0.88, 1.53, and 1.97 supplemented with 10 mM Fe(III)-Citrate, and 9.39 μM PCP.

Initial PCP Concentration and Cell Density. PCP degradation rates were directly proportional to the initial concentration of PCP added to the reactor (FIG. 2). The highest concentration tested (188 $\mu M$) was below the toxic threshold for strain 200P, however the upper limit of PCP concentration was not determined. The rate of PCP transformation was also directly proportional to the cell density in the bioreactor (FIG. 3). PCP was degraded at a rate of 0.61 $\mu M$ $hr^{-1}$ at a cell density of $1.5 \times 10^9$ cells $ml^{-1}$ while PCP degradation rates decreased to 0.31 $\mu M\ hr^{-1}$ at a cell of $0.8 \times 10^9$ cells $ml^{-1}$.

Figure 4:
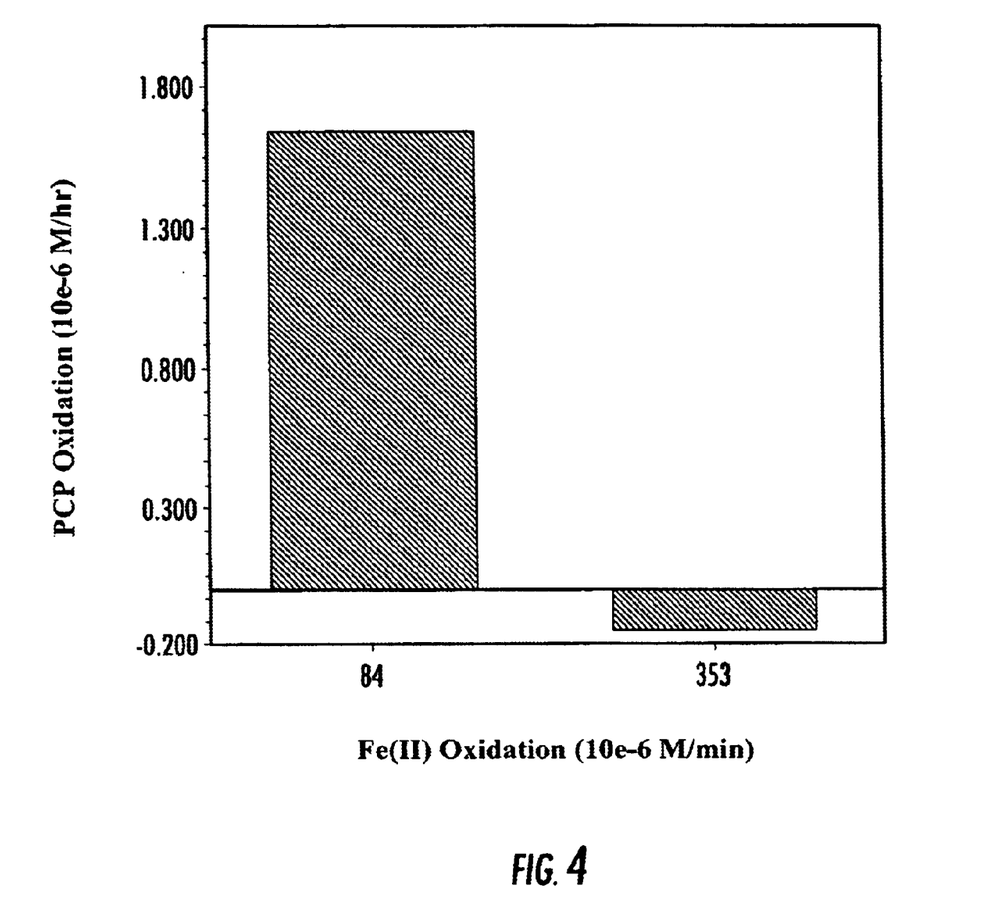
FIG. 4 is a bar chart graph showing the effect of Fe(II) oxidation rate on PCP transformation rate in cell suspensions supplemented with 5 mM Fe(III)-Citrate and 37.55 μM PCP.

Fe(II) Oxidation Rate. PCP degradation rates varied inversely with Fe(II) oxidation rates (FIG. 4). PCP was degraded at a rate of 2.81 $\mu Mhr^{-1}$ during three complete anaerobic/aerobic cycles at Fe(II) oxidation rates of 50 $\mu M\ min^{-1}$, while PCP was degraded at a rate of 1.62 $\mu M\ hr^{-1}$ at Fe(II) oxidation rates of 84 $\mu M\ min^{-1}$. PCP levels remained constant during five complete anaerobic/aerobic cycles at Fe(II) oxidation rates of 350 $\mu M\ min^{-1}$.

Figure 5:
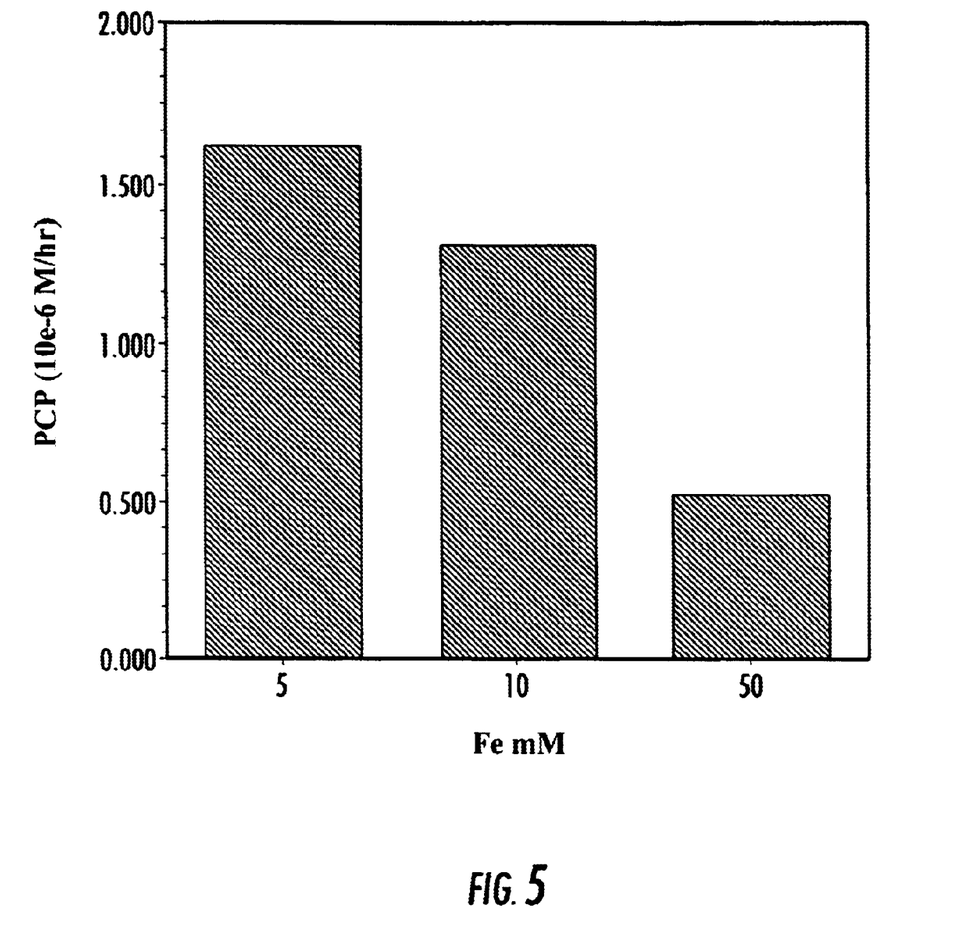
FIG. 5 is a bar chart graph showing the effect of initial Fe(III)-Citrate levels (5, 10, 50 mM) on PCP transformation rate in cell suspensions supplemented with 37.55 μM PCP.

Initial Fe(III)-Citrate Levels. PCP degradation rates varied inversely with initial Fe(III)-citrate concentrations. As Fe(III)-citrate levels increased, PCP degradation rates decreased (FIG. 5). PCP was degraded at a rate of 0.53 $\mu M\ hr^{-1}$ when Fe(III)-citrate was supplied at a concentration of 50 mM. PCP was degraded at a rate of 1.32 $\mu M\ hr^{-1}$ when initial Fe(III)-citrate levels were decreased to 10 mM. PCP was degraded at a rate of 1.62 $\mu M\ hr^{-1}$ when initial Fe(III)-citrate levels were decreased further to 5 mM. The highest degradation rate observed was 9.2 $\mu M\ hr^{-1}$ when Fe(III)-citrate was supplemented at 2.5 mM.

Figure 6:
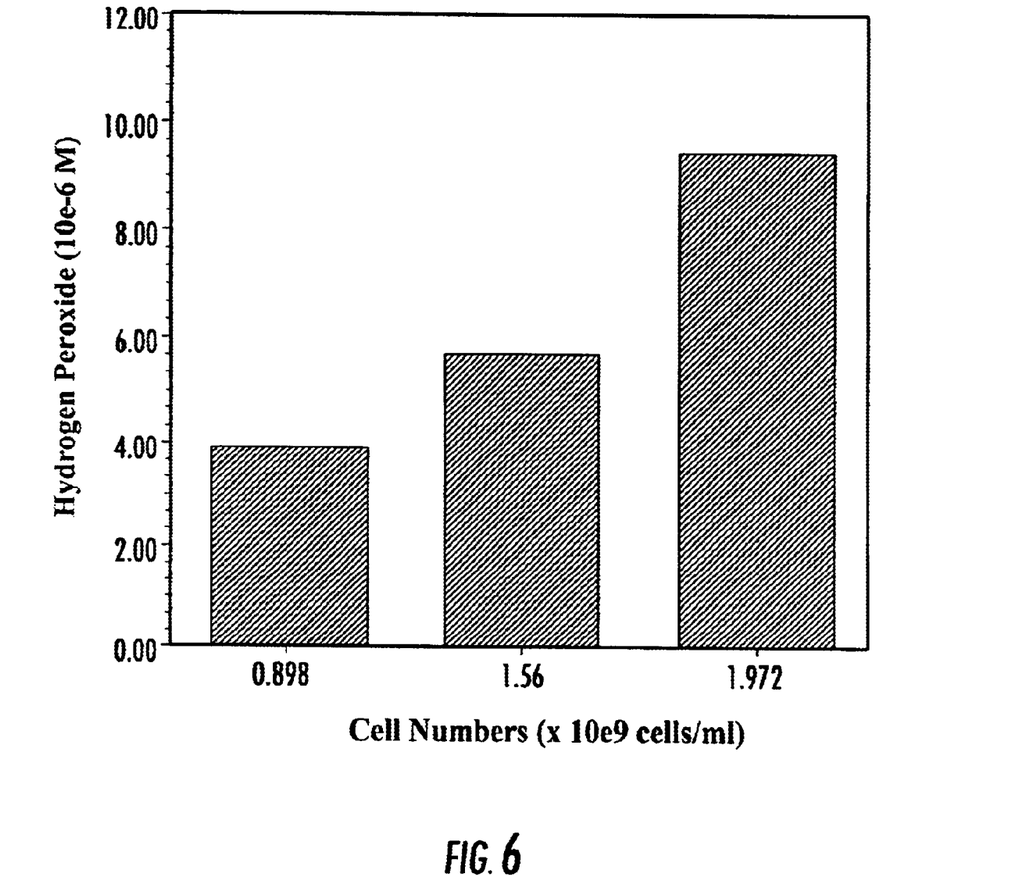
FIG. 6 is a bar chart graph showing $H_2O_2$ production by varied cell densities of *S. putrefaciens* strain 200P (0.898, 1.560, and 1.97×$10^9$cells/ml) exposed to aerobic conditions for 6 h in iron-free LS.

Effect of Cell Density on $H_2O_2$ Formation. The $H_2O_2$ levels measured in aerobic cultures of strain 200P were directly proportional to cell density (FIG. 6). $H_2O_2$ was detected at a concentration of 10.0 $\mu M$ in cell suspensions ($2.0 \times 10^9$ cells $ml^{-1}$) incubated under continuous aerobic conditions for 6 h. The concentration of $H_2O_2$ decreased to 4.0 $\mu M$ at a cell density of $0.9 \times 10^9$ cells $ml^{-1}$ and under continuous aerobic conditions.

To achieve efficient removal of PCP, OH* must react with PCP at rates greater than the rate at which it reacts with competing substrates. Fe(II) is required to generate OH*, but Fe(II) also acts as an OH* scavenger. Fortunately, the rate of reaction of OH* with Fe(II) ($k_{Fe(II)}=4.3 \times 10^8 M^{-1}s^{-1}$) is nearly 10-fold slower than the rate at which it reacts with PCP ($k_{PCP}=4 \times 10^9\ M^{-1}s^{-1}$). PCP therefore has a kinetic advantage over Fe(II) as a reactant with OH*. High Fe(II) concentrations, however, may competitively inhibit the reaction between PCP and OH*. However, Fe(II)-dependent OH* formation is the rate-limiting step for PCP degradation.

Figure 8:
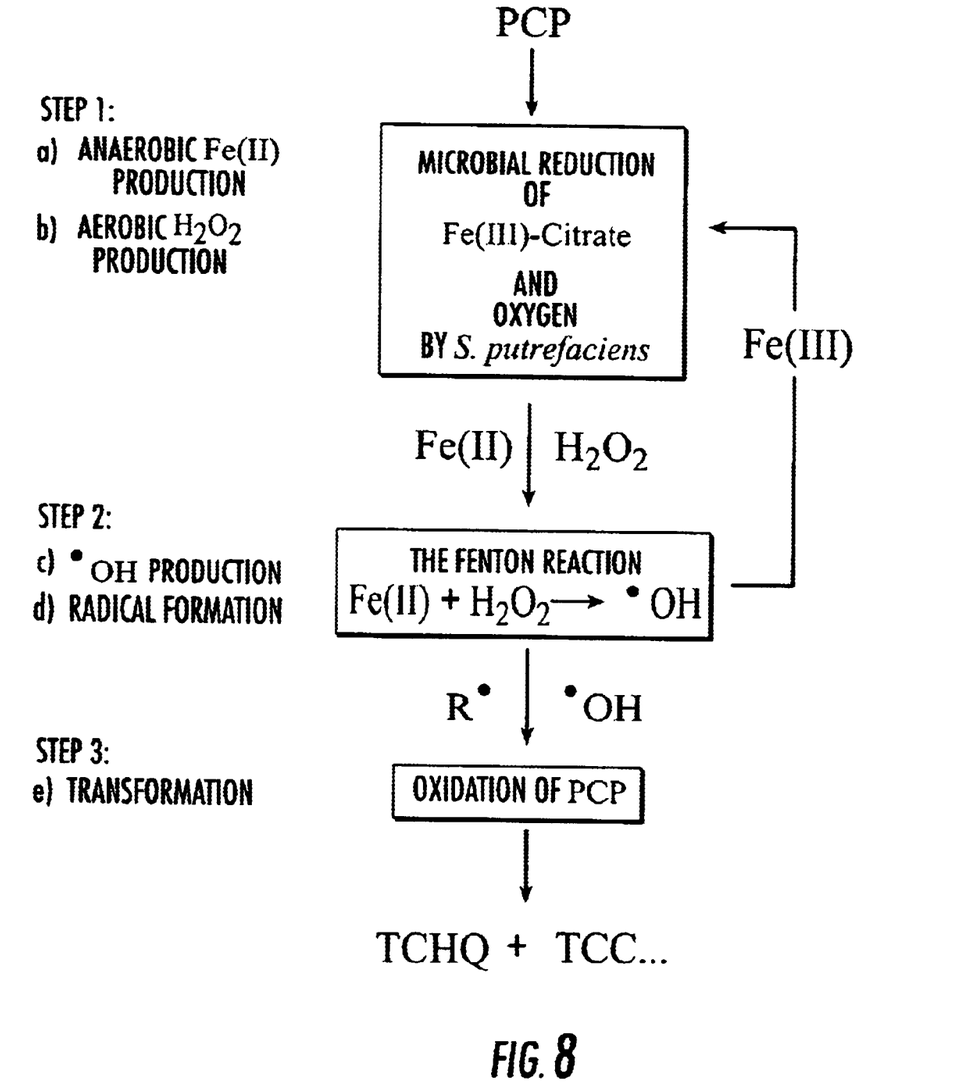
FIG. 8 is a design scheme for the microbially-driven Fenton oxidation of PCP.

The overall design of the microbially-driven Fenton system used to degrade PCP is shown schematically in FIG. 8. Fe(II) and $H_2O_2$ are formed in the first step by the microbially-catalyzed reduction of Fe(III)-citrate and $O_2$ during alternating anaerobic and aerobic bioreactor conditions. The chemical interaction between Fe(II) and $H_2O_2$ provides a continuous source of organic radicals and OH in step 2. Transformation of PCP yields TCHQ and TCC in step 3. Under optimal reactor conditions and substrate levels, TCHQ and TCC were also degraded, although the transformation products were not determined.

Fe(II) is needed to drive OH* formation, yet Fe(II) also acts as an OH* scavenger (eq A). In the present example, PCP degradation rates were inversely proportional to initial Fe(III)-citrate levels. Fe(III)-citrate is reduced to Fe(II). Fe(II) reacts with $H_2O_2$ and OH*, to either form or scavenge OH*(eq x-x). OH* reacts faster with PCP (eq B) than Fe(II) (eq C), but if Fe(II) is in excess, PCP degradation maybe inhibited. Conversely, higher PCP doses can overcome Fe(II)-dependent kinetic inhibition. This kinetic effect may explain why PCP degradation rates are proportional to initial PCP levels. The higher the initial concentration of PCP in cell suspensions exposed to OH* generating conditions, the faster the observed rate of PCP removal.

|  | $k(M^{-1}s^{-1})$ | eq |
|---|---|---|
| Fe(II) + $H_2O_2$ ⇌ OH· + OH⁻ | 10e 3 or 5 | (A) |
| Fe(II) + OH· ⇌ Fe(III) + OH⁻ | $4.3 \times 10^8$ | (B) |
| PCP + OH· ⇌ TCHQ + TCC + Cl⁻ + OH⁻ | $4.0 \times 10^9$ | (C) |

PCP is not degraded in cultures exposed to rapid Fe(II)-oxidizing conditions. One possible explanation for this observation is the requirement of Fe(II) in the Fenton reaction (eq 1). Initial results demonstrate that PCP is not degraded in the presence of the Fe(II)-chelator DETAPAC, demonstrating the importance of free Fe(II) in the PCP degradation pathway. A second explanation involves electron shuttling through equimolar concentrations of Fe(II)/Fe(III). Under slower Fe(II) oxidation conditions the ratio of Fe(II)/Fe(III) are equimolar for extended periods of time. Maintaining equimolar concentrations of Fe(II)/Fe(III) has been shown to propagate $O_2^{-*}$ formation and Fe(II) regeneration via the following reactions:

| $O_2^{-\cdot}$ + Fe(III) ($O_2$ + Fe(II)) | (6) |
|---|---|
| Fe(II + $O_2^{-\cdot}$ ($H_2O_2$ + Fe(III)) | (7) |

The more rapid decrease in Fe(II) concentrations during rapid oxidation results in less exposure to optimal Fe(II) levels and Fe(II) is not available to catalyze the disproportionation of $O_2^{-*}$ to $H_2O_2$ (eq 6–7). This may explain the lower PCP degradation rates under these conditions. Under conditions where Fe(II) and Fe(III) are in an equimolar ratio, PCP, TCHQ, and TCC were more rapidly degraded. This finding suggests that conditions favoring simultaneous Fe(II) oxidation and Fe(III) reduction are more optimal for overall transformation reactions (eq 6–7). These conditions most likely mimic those observed in the FNA plate assay (FIG. 7a) where Fe(III) and Fe(II) are present simultaneously.

The linear relationship between cell density, $H_2O_2$ concentration and rates of PCP degradation rates may be due to increased rates of Fe(II) or $H_2O_2$ production. The microbially-driven Fenton reaction may be a cell surface-associated phenomenon in which PCP is oxidized by OH* near the site of Fe(II) and $H_2O_2$ formation. Fe(III) reduction by *S. putrefaciens* requires physical contact with Fe(III)-oxide particles suggesting that Fe(II) is produced at the cell surface. Therefore Fe(III) and $H_2O_2$ may react to produce OH* at the cell surface. Generating greater amounts of Fenton reagents by increasing cell densities may explain the observed increased rate of PCP transformation in more dense cultures.

A microbially-driven Fenton reaction is able to transform PCP and other organic contaminants at neutral pH without $H_2O_2$ addition or UV irradiation. Optimal substrate levels and reactor conditions included a cell density of $2 \times 10^9$ cells $ml^{-1}$, initial PCP concentration of 188 $\mu M$, an initial Fe(III) concentration of 2.5 mM and an Fe(II) oxidation rate of 84 $\mu M\ min$. Optimized PCP degradation rates (9.2 $\mu M\ hr^{-1}$) were 30-fold higher than those previously reported.

While the specification has described the invention in relation to certain preferred embodiments, and while many details have been set forth above for the purpose of illustration, the invention is not limited thereto. It will be apparent to those of ordinary skill in the art that the invention is susceptible to additional embodiments and that modification of reaction parameters can be achieved without departing from the spirit and scope of the present invention.

What is claimed is:

1. A process for oxidatively degrading an organic contaminant comprising the step of:
    incubating PCP-acclimated S. *putrefaciens* 200 and about 2.5 mM iron (III) to produce the Fenton reagents Fe(II) and $H_2O_2$ in the presence of an organic contaminant under neutral pH conditions to yield a product.

2. The process of claim 1, wherein the process is conducted under alternating anaerobic and aerobic conditions.

3. The process of claim 1, wherein the reaction is maintained at a temperature of about 30° C. and a pH of about 7.0.

4. The process of claim 1, wherein the contaminant comprises pentachlorophenol.

5. The process of claim 1, wherein the degraded product comprises tetrachlorohydroquinone (TCHQ) and tetrachlorocatechol (TCC).

6. The process of claim 5, wherein the reaction is maintained at a temperature of about 30° C. and a pH of about 7.0.

7. The process of claim 1, wherein the organic contaminant is present in soil.

8. The process of claim 1, wherein the organic contaminant is present in groundwater.

9. A process for oxidatively degrading pentachlorophenol comprising the step of:
    incubating PCP-acclimated S. *putrefaciens* strain 200 and about 2.5 mM iron (III) citrate under alternating anaerobic and aerobic conditions to produce the Fenton reagents Fe(II) and $H_2O_2$ in the presence of pentachlorophenol at a temperature of about 30° C. and a pH of about 7.0.

10. The process of claim 9, wherein the pentachlorophenol is present in soil.

11. The process of claim 9, wherein the pentachlorophenol is present in groundwater.

12. A process for oxidatively degrading an organic contaminant comprising the step of:
    incubating PCP-acclimated S. *putrefaciens* strain 200 and about 2.5 mM iron (III) citrate under alternating anaerobic and aerobic conditions to produce the Fenton reagents Fe(II) and $H_2O_2$ in the presence of a contaminant under neutral pH conditions to yield a product.

13. The process of claim 12, wherein the reaction is maintained at a temperature of about 30° C. and a pH of about 7.0.

14. The process of claim 12, wherein the contaminant comprises pentachlorophenol.

15. The process of claim 12, wherein the degraded product comprises tetrachlorohydroquinone (TCHQ) and tetrachlorocatechol (TCC).

16. The process of claim 12, wherein the organic contaminant is present in soil.

17. The process of claim 12, wherein the organic contaminant is present in groundwater.

18. A process for degrading organic contaminants, the process comprising the step of:
    microbially producing Fe(II) and $H_2O_2$ at about neutral pH with PCP-acclimated S. *putrefaciens* strain 200 in the presence of an organic contaminant, wherein the organic contaminant is degraded at a rate of more than about 1.62 $\mu$M/hr.

19. The process of claim 18, wherein the process is performed during alternating aerobic and anaerobic conditions.

20. The process of claim 18, wherein the microbe comprises a facultative anaerobe.

21. The process of claim 18, wherein the contaminate is degraded at a rate of at least about 9.2 $\mu$M/hr.

22. The process of claim 18, wherein oxygen is reduced to form $H_2O_2$.

23. The process of claim 22, wherein $H_2O_2$ reacts with Fe(II) to form radicals.

24. The process of claim 23, wherein the radicals degrade the contaminate.

25. A process for degrading a an organic contaminant, the process comprising the step of:
    microbially reducing Fe(III) and oxygen at about neutral pH with PCP-acclimated S. *putrefaciens* strain 200 in the presence of a an organic contaminant, wherein the organic contaminant is degraded at a rate of more than about 1.62 $\mu$M/hr.

26. The process of claim 25, wherein Fe(III) comprises Fe(III) citrate.

27. The process of claim 25 wherein Fe(III) is reduced to form Fe(II).

28. The process of claim 25, wherein the contaminant comprises pentachlorophenol.

29. The process of claim 25, wherein Fe(III) is less than 5 mM.

30. A process for oxidatively degrading an organic contaminant comprising the step of:
    combining PCP-acclimated S. *putrefaciens* 200 with less than 5 mM iron (III) and an organic contaminant under neutral pH conditions.

31. A process for degrading an organic contaminant comprising the step of:
    combining PCP-acclimated S. *putrefaciens* strain 200 with said organic contaminate and iron under alternating anaerobic and aerobic conditions, wherein said PCP-acclimated S. *putrefaciens* strain 200 produces Fe(II) and $H_2O_2$ to oxidatively degrade said organic contaminate at a rate of more than about 1.62 $\mu$M/hr.

* * * * *